US007411367B2

(12) United States Patent  (10) Patent No.: US 7,411,367 B2
Tsai et al.  (45) Date of Patent: Aug. 12, 2008

(54) FULL BRIDGE CIRCUIT AND DC MOTOR CAPABLE OF FIXING OUTPUT VOLTAGE AND AVOIDING REVERSE CURRENT

(75) Inventors: Ming-Jung Tsai, Chang-Hua (TW); Ching-Sheng Li, Hsinchu County (TW); Shen-Min Lo, Hsinchu (TW); Kun-Min Chen, Changhua County (TW)

(73) Assignee: Anpec Electronics Corporation, Hsin-Chu (TW)

( * ) Notice: Subject to any disclaimer, the term of this patent is extended or adjusted under 35 U.S.C. 154(b) by 131 days.

(21) Appl. No.: 11/610,506

(22) Filed: Dec. 14, 2006

(65) Prior Publication Data

US 2007/0285038 A1 Dec. 13, 2007

Related U.S. Application Data

(60) Provisional application No. 60/804,556, filed on Jun. 12, 2006.

(51) Int. Cl.
*H02P 7/00* (2006.01)
(52) U.S. Cl. .................. 318/434; 318/432; 323/274; 323/284; 361/18; 361/93.1
(58) Field of Classification Search ........... 318/434, 318/432; 323/274, 284; 361/18, 93.1
See application file for complete search history.

(56) References Cited

U.S. PATENT DOCUMENTS

| 4,506,203 | A  | * | 3/1985 | Redmond, Jr. | 318/624 |
| 5,481,194 | A  | * | 1/1996 | Schantz et al. | 324/522 |
| 6,268,716 | B1 | * | 7/2001 | Burstein et al. | 323/272 |
| 6,396,250 | B1 | * | 5/2002 | Bridge | 323/283 |
| 6,433,497 | B1 | * | 8/2002 | Lee | 318/400.04 |
| 2004/0155616 | A1 | * | 8/2004 | Iribe et al. | 318/432 |
| 2006/0214611 | A1 | * | 9/2006 | Wang et al. | 318/254 |

* cited by examiner

*Primary Examiner*—Rita Leykin
(74) *Attorney, Agent, or Firm*—Winston Hsu

(57) ABSTRACT

A full bridge circuit includes a first switch, a second switch, a third switch, a fourth switch, a first controller, a second controller, a first operational amplifier, a first multiplexer, a second operational amplifier, and a second multiplexer. The first controller includes a first output coupled to the first switch. The second controller includes a first output coupled to the third switch. The first operational amplifier includes a first input coupled to the first switch and the second switch, and a second input for receiving a first reference voltage. The second operational amplifier includes a first input coupled to the third switch and the fourth switch, and a second input for receiving a second reference voltage. The first multiplexer is coupled to the first operational amplifier, the first controller, and the second switch. The second multiplexer is coupled to the second operational amplifier, the second controller, and the fourth switch.

16 Claims, 13 Drawing Sheets

FULL BRIDGE CIRCUIT AND DC MOTOR CAPABLE OF FIXING OUTPUT VOLTAGE AND AVOIDING REVERSE CURRENT

CROSS REFERENCE TO RELATED APPLICATIONS

This application claims the benefit of U.S. Provisional Application No. 60/804,556, filed Jun. 12, 2006, and included herein by reference.

BACKGROUND OF THE INVENTION

1. Field of the Invention

The present invention relates to a DC motor and a full bridge circuit, and more particularly, to a DC motor and a full bridge circuit utilizing operational amplifiers and multiplexers to fix output voltages and avoid reverse current.

2. Description of the Prior Art

A DC motor driver is a necessary power transformation device in modern industries and the information society. The DC motor is capable of transforming electricity into kinetic energy required for driving devices. Conventional motors include DC motors, AC motors, and stepping motors. DC motors and AC motors are often applied in products not requiring delicate manipulations. For example, blades of an electric fan are rotated with a DC motor or an AC motor. As the technology of digital products grows, a rotation rate of a DC motor or an AC motor is required to be faster and faster. However, with a high rotation rate of a motor, the current of the motor cannot be consumed completely. The unconsumed and therefore remaining currents reversely flow to a corresponding power supply. This scenario leads to damages of controllers and drivers of the motor. Therefore, the damages caused by reverse current under a high rotation rate of the motor have to be avoided.

Please refer to FIG. 1, which is a diagram of a DC motor 10 in the prior art. The DC motor 10 comprises a power supply 12, an input capacitor C1, a hall sensor 16, a first controller 20, a second controller 21, and a full bridge circuit 14. The power supply 12 is utilized for generating an input voltage Vin. The input capacitor C1 is coupled to the power supply 12. A voltage difference between both terminals of the input capacitor C1 is a supply voltage VDD. The Hall sensor 16 has a first output end 162 for generating a first timing control signal H+, and a second output end 164 for generating a second timing control signal H−.

The first controller 20 has a first input end 102 coupled to the first output end 162 of the Hall sensor 16, a second input end 104 coupled to the second output end 164 of the Hall sensor 16, a first output end 106 for generating a first switch control signal, and a second output end 108 for generating a second switch control signal. The second controller 21 has a first input end 112 coupled to the second output end 164 of the Hall sensor 16, a second input end 114 coupled to the first output end 162 of the Hall sensor 16, a first output end 116 for generating a third switch control signal, and a second output end 118 for generating a fourth switch control signal.

The full bridge circuit 14 has an input end 142 coupled to the power supply 12 and the input capacitor C1, and the voltage at the input end 142 is the supply voltage VDD. The full bridge circuit 14 comprises a first switch SW1, a second switch SW2, a third switch SW3, a fourth switch SW4, and a motor loading Le. The first switch SW1 has a control terminal 132 coupled to the first output end 106 of the first controller 20, an input end 134 coupled to the power supply 12 and the input capacitor C1, and an output end 136 for generating a first output voltage Vout1. The second switch SW2 has a control terminal 152 coupled to the second output end 108 of the first controller 20, an input end 154 coupled to ground, and an output end 156 coupled to the output end 136 of the first switch SW1. The third switch SW3 has a control terminal 172 coupled to the first output end 116 of the second controller 21, an output end 174 coupled to the power supply 12 and the input capacitor C1, and an output end 176 for generating a second output voltage Vout2. The fourth switch SW4 has a control terminal 192 coupled to the second output end 118 of the second controller 21, an input end 194 coupled to ground, and an output end 196 coupled to the output end 176 of the third switch SW3. The motor loading Le has a first terminal 182 coupled to the first switch SW1 and the second switch SW2, and a second terminal 184 coupled to the third switch SW3 and the fourth switch SW4.

The first switch SW1, the second switch SW2, the third switch SW3, and the fourth switch SW4 may be metal-oxide semiconductor transistors, for example, the first switch SW1 and the third switch SW3 are P-type metal-oxide semiconductor transistors, and the second switch SW2 and the fourth switch SW4 are N-type metal-oxide semiconductor transistors. The first switch SW1, the second switch SW2, the third switch SW3, and the fourth switch SW4 may also be bipolar-junction transistors, for example, the first switch SW1 and the third switch SW3 are NPN bipolar-junction transistors, and the second switch SW2 and the fourth switch SW4 are PNP bipolar-junction transistors. In the same way, the first switch SW1 and the third switch SW3 are PNP bipolar-junction transistors, and the second switch SW2 and the fourth switch SW4 are NPN bipolar-junction transistors. Even the four switches SW1-SW4 are all PNP bipolar-junction transistors or NPN bipolar-junction transistors.

Please refer to FIG. 1 and FIG. 2. FIG. 2 is a timing diagram of the signals shown in FIG. 1. The DC motor 10 controls the switches of the full bridge circuit 14 and the waveforms of the first output voltage Vout1 and the second output voltage Vout2 are square waves. The first timing control signal H+ and the second timing control signal H− outputted from the Hall sensor 16 control turning on and turning off the first switch SW1, the second switch SW2, the third switch SW3, and the fourth switch SW4. The first switch SW1 and the fourth switch SW4 are turned on and the third switch SW3 and the second switch SW2 are turned off, when the first timing control signal H+ is low and the second timing control signal H− is high. The direction of a motor current $I_{Le}$ flows from the first output voltage Vout1 to the second output voltage Vout2. At this time, the first output voltage Vout1 is high and the second output voltage Vout2 is low. During the transition of the first timing control signal H+ and the second timing control signal H−, the second switch SW2 and the fourth switch SW4 are turned on, and the first switch SW1 and the third switch SW3 are turned off. The motor current $I_{Le}$ weakens gradually through the second switch SW2 and the fourth switch SW4. At this time, both the first output voltage Vout1 and the second output voltage Vout2 are low. When the first timing control signal H+ is high and the second timing control signal H− is low, the second switch SW2 and the third switch SW3 are turned on, and the first switch SW1 and the fourth switch SW4 are turned off. The motor current $I_{Le}$ flows from the second output voltage Vout2 to the first output voltage Vout1, at this time, the first output voltage Vout1 is low, and the second output voltage Vout2 is high.

Please refer to FIG. 3, which is a waveform diagram of the signals of FIG. 1 when a high rotation rate of the DC motor results in a voltage spike. During the first stage, the first timing control signal H+ is low, and the second timing control signal H− is high. The motor current $I_{Le}$ flows from the first output voltage Vout1 to the second output voltage Vout2, at this time, the first output voltage Vout1 is high, and the second output voltage Vout2 is low. During the second stage and the transition of the first timing control signal H+ and the second timing control signal H−, the motor current $I_{Le}$ weakens gradually through the second switch SW2 and the fourth switch SW4. However, since the rotation rate of the DC motor is high, the motor current $I_{Le}$ cannot be weakened to be zero after the transition of the switches. Therefore, during the third stage, the motor current $I_{Le}$ flows reversely to the supply voltage VDD through the second switch SW2 and the fourth switch SW4, and charges the input capacitor to result in a voltage spike. As shown in FIG. 3, the magnitude of the voltage spike depends on the magnitude of the reverse current flowing into the input capacitor C1 and the capacitance of the input capacitor C1. During the fourth stage when the first timing control signal H+ turns to high and the second timing control signal H− turns to low, the motor current $I_{Le}$ flows from the second output voltage Vout2 to the first output voltage Vout1, at this time, the first output voltage Vout1 is low, and the second output voltage Vout2 is high.

Please refer to FIG. 4, which is a diagram illustrating the flow of the motor current $I_{Le}$ during the first stage shown in FIG. 3. During the first stage, the first switch SW1 and the fourth switch SW4 are fully on. The motor current $I_{Le}$ flows from the first output voltage Vout1 to the second output voltage Vout2.

Please refer to FIG. 5, which is a diagram illustrating the flow of the motor current $I_{Le}$ during the second stage shown in FIG. 3. During the second stage, the second switch SW2 and the fourth switch SW4 are turned on. At this time, the motor current $I_{Le}$ weakens gradually. The motor current $I_{Le}$ continues to flow from the first output voltage Vout1 to the second output voltage Vout2.

Please refer to FIG. 6, which is a diagram illustrating the flow of the motor current $I_{Le}$ during the third stage shown in FIG. 3. During the third stage, motor current $I_{Le}$ continues to flow from the first output voltage Vout1 to the second output voltage Vout2 due to the motor current $I_{Le}$ not decaying to zero yet. The second switch SW2 and the third switch SW3 are turned on, and the motor current $I_{Le}$ flows from the second switch SW2 to the third switch SW3. At this time, the motor current $I_{Le}$ charges the input capacitor C1 to increase the supply voltage VDD and to result in a voltage spike.

Please refer to FIG. 7, which is a diagram illustrating the flow of the motor current $I_{Le}$ during the fourth stage shown in FIG. 3. During the fourth stage, since the motor current $I_{Le}$ has weakened to be zero, the second switch SW2 and the third switch SW3 are turned on whereas the first switch SW1 and the fourth switch SW4 are turned off. The motor current $I_{Le}$ flows from the second output voltage Vout2 to the first output voltage Vout1.

For a DC motor having a low rotation rate, the motor current $I_{Le}$ can decay to zero during the transition of the first timing control signal H+ and the second timing control signal H−. However, in modern applications, the rotation rate of a modern motor is ever increasing. When the rotation rate of the motor exceeds a limit, the motor current $I_{Le}$ has not weakened to be zero after the transition of the switches. At this time, the motor current $I_{Le}$ flows reversely to the supply voltage VDD through the second switch SW2 and the third switch SW3, and charges the input capacitor C1 to result in the voltage spike. Therefore, the controller and the driver of the DC motor 10 would be damaged or burned down, the power supply 12 may be burned down also, and the reliability and the effective operational range of the system of the DC motor 10 would be degraded.

SUMMARY OF THE INVENTION

The claimed invention provides a full bridge circuit capable of fixing output voltages. The full bridge circuit includes a first switch, a second switch, a third switch, a fourth switch, a first controller, a second controller, a first operational amplifier, a first multiplexer, a second operational amplifier, and a second multiplexer. An output end of the second switch is coupled to an output end of the first switch for generating a first output voltage. An input end of the third switch is coupled to an input end of the first switch. An input end of the fourth switch is coupled to an input end of the second switch. An output end of the fourth switch is coupled to an output end of the third switch for generating a second output voltage. The first controller includes a first output end coupled to a control end of the first switch and a second output end. The second controller includes a first output end coupled to a control end of the third switch and a second output end. The first operational amplifier includes a first input end coupled to the first switch and to the second switch for receiving the first output voltage, and a second input end for receiving a first reference voltage.

The first multiplexer includes a first input end coupled to an output end of the first operational amplifier, a second input end coupled to the second output end of the first controller, a control end, and an output end coupled to a control end of the second switch. The first multiplexer is used for controlling the first multiplexer to input from the first input end or the second input end of the first multiplexer according to the first control signal outputted from the first controller. The second operational amplifier includes a first input end coupled to the third switch and to the fourth switch for receiving the second output voltage, and a second input end for receiving a second reference voltage. The second multiplexer includes a first input end coupled to an output end of the second operational amplifier, a second input end coupled to a second output end of the second controller, a control end, and an output end coupled to a control end of the fourth switch. The second multiplexer is used for controlling the second multiplexer to input from the first input end or the second input end of the second multiplexer according to the second control signal outputted from the second controller.

The full bridge circuit further includes a first logic circuit, a first current detection circuit, a first reference voltage generator, a second logic circuit, a second current detection circuit, and a second reference voltage generator. The first logic circuit is coupled between the first controller and the control end of the first multiplexer. The first logic circuit is used for controlling the first multiplexer to input from the first input end or the second input end of the first multiplexer according to the first control signal outputted from the first controller. The first current detection circuit is coupled between the output end of the first multiplexer and the first logic circuit for detecting currents. The first reference voltage generator is coupled to the second input end of the first operational amplifier for generating the first reference voltage. The second logic circuit is coupled between the second controller and the control end of the second multiplexer. The second logic circuit is used for controlling the second multiplexer to input from the first input end or the second input end of the second multiplexer according to the second control signal outputted from the second controller. The second current detection circuit is coupled between the output end of the second multiplexer and the second logic circuit for detecting currents. The second reference voltage generator is coupled to the second input end of the second operational amplifier for generating the second reference voltage.

The claimed invention provides a DC motor capable of avoiding reverse current. The DC motor includes a Hall sensor and a full bridge circuit. The Hall sensor includes a first output end for generating a first timing control signal, and a second output end for generating a second timing control signal. The full bridge circuit includes a first switch, a second switch, a third switch, a fourth switch, a first controller, a second controller, a first operational amplifier, a first multiplexer, a second operational amplifier, and a second multiplexer. An output end of the second switch is coupled to an output end of the first switch for generating a first output voltage. An input end of the third switch is coupled to an input end of the first switch. An input end of the fourth switch is coupled to an input end of the second switch. An output end of the fourth switch is coupled to an output end of the third switch for generating a second output voltage.

The first controller includes a first input end coupled to the first output end of the Hall sensor, a second input end coupled to the second output end of the Hall sensor, a first output end coupled to a control end of the first switch, and a second output end coupled to a control end of the second switch. The second controller includes a first input end coupled to the second output end of the Hall sensor, a second input end coupled to the first output end of the Hall sensor, a first output end coupled to a control end of the third switch, and a second output end coupled to a control end of the fourth switch. The first operational amplifier includes a first input end coupled to the first switch and to the second switch for receiving the first output voltage, and a second input end for receiving a first reference voltage.

The first multiplexer includes a first input end coupled to an output end of the first operational amplifier, a second input end coupled to the second output end of the first controller, a control end, and an output end coupled to a control end of the second switch. The first multiplexer is used for controlling the first multiplexer to input from the first input end or the second input end of the first multiplexer according to the first control signal outputted from the first controller. The second operational amplifier includes a first input end coupled to the third switch and to the fourth switch for receiving the second output voltage, and a second input end for receiving a second reference voltage. The second multiplexer includes a first input end coupled to an output end of the second operational amplifier, a second input end coupled to a second output end of the second controller, a control end, and an output end coupled to a control end of the fourth switch. The second multiplexer is used for controlling the second multiplexer to input from the first input end or the second input end of the second multiplexer according to the second control signal outputted from the second controller.

The full bridge circuit further includes a first logic circuit, a first current detection circuit, a first reference voltage generator, a second logic circuit, a second current detection circuit, and a second reference voltage generator. The first logic circuit is coupled between the first controller and the control end of the first multiplexer. The first logic circuit is used for controlling the first multiplexer to input from the first input end or the second input end of the first multiplexer according to the first control signal outputted from the first controller. The first current detection circuit is coupled between the output end of the first multiplexer and the first logic circuit for detecting currents. The first reference voltage generator is coupled to the second input end of the first operational amplifier for generating the first reference voltage. The second logic circuit is coupled between the second controller and the control end of the second multiplexer. The second logic circuit is used for controlling the second multiplexer to input from the first input end or the second input end of the second multiplexer according to the second control signal outputted from the second controller. The second current detection circuit is coupled between the output end of the second multiplexer and the second logic circuit for detecting currents. The second reference voltage generator is coupled to the second input end of the second operational amplifier for generating the second reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
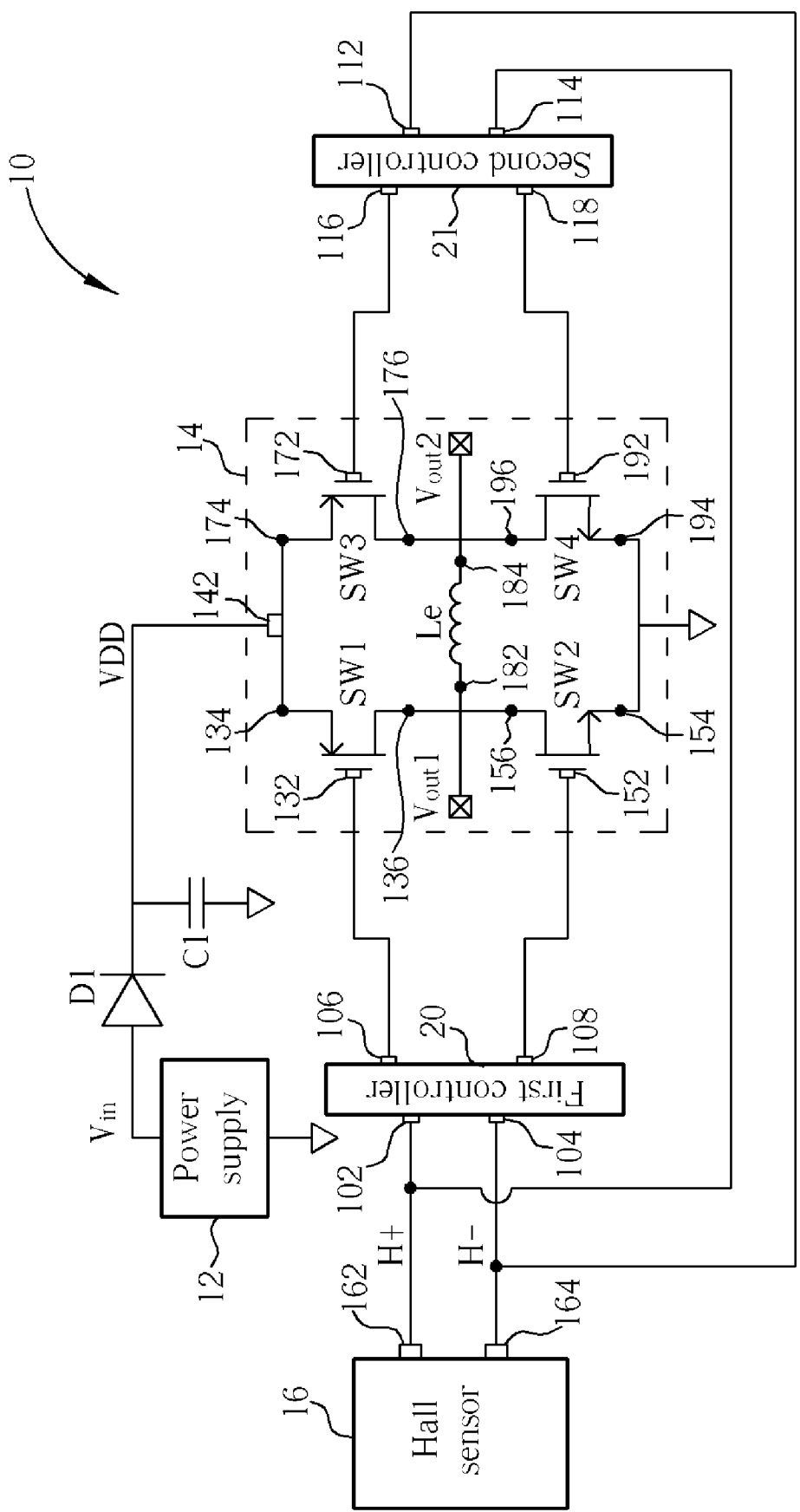
FIG. 1 is a diagram of a DC motor in the prior art.
Figure 2:
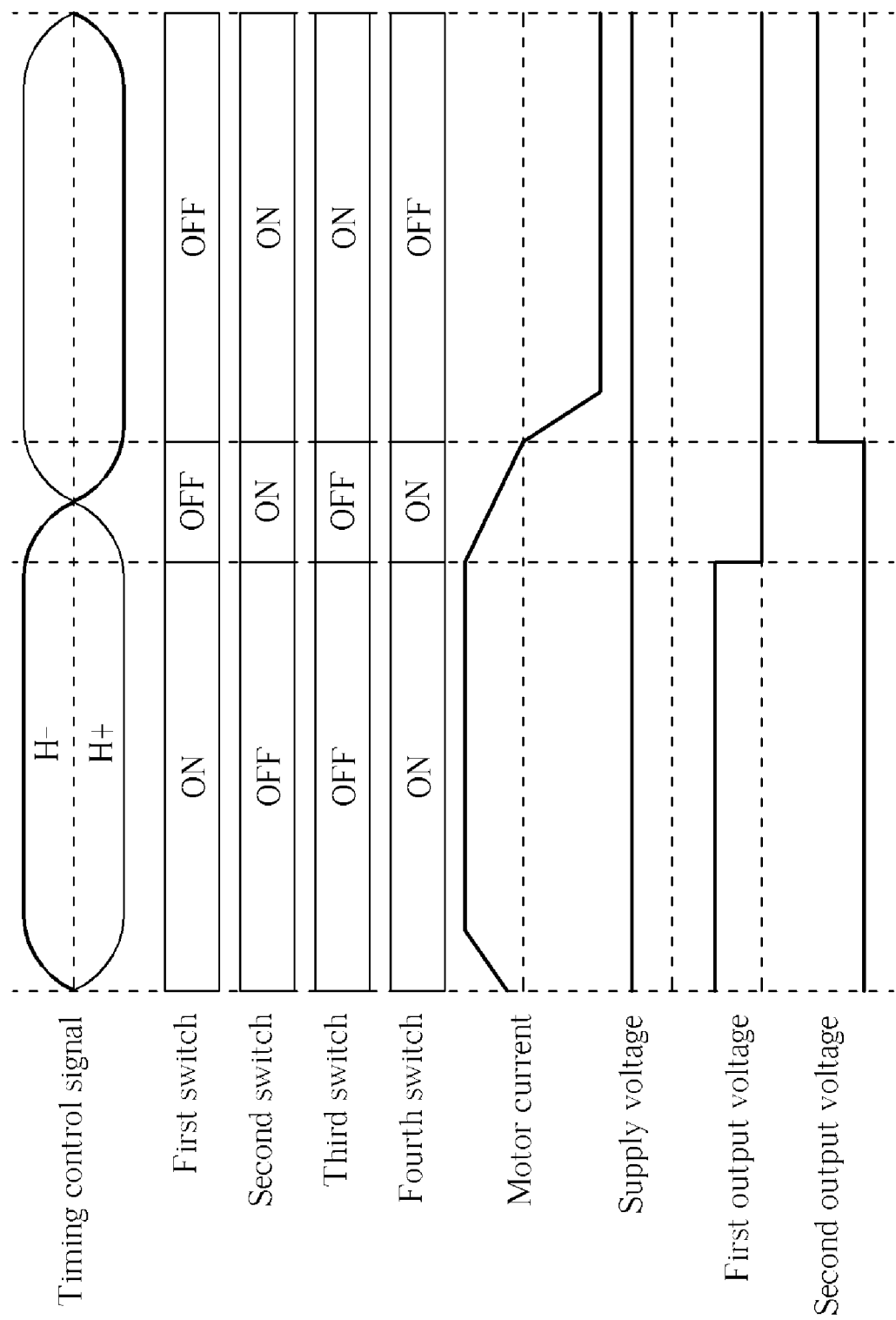
FIG. 2 is a timing diagram of the signals of the DC motor of FIG. 1.
Figure 3:
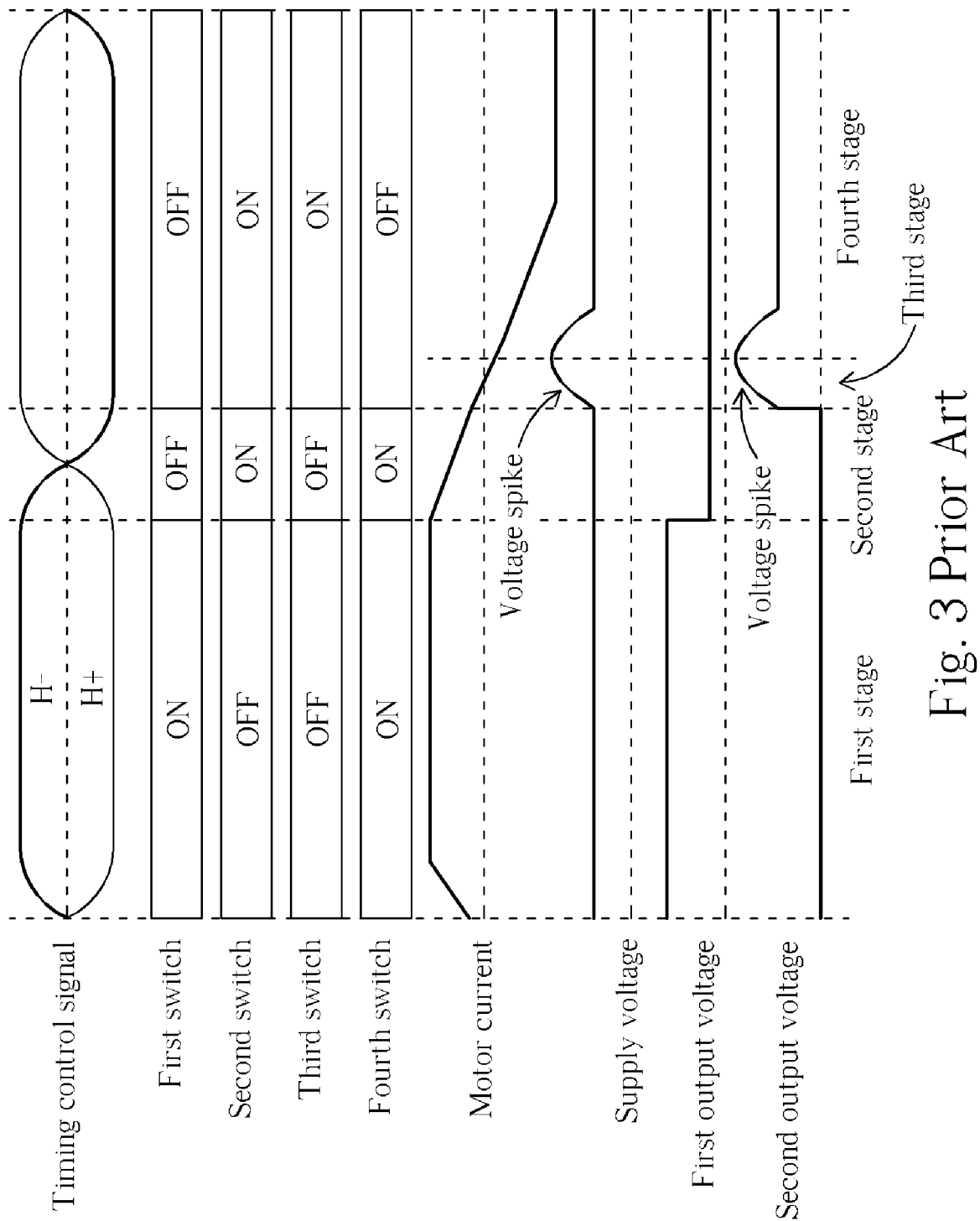
FIG. 3 is a diagram illustrating the signals of the DC motor of FIG. 1 resulting in voltage spikes due to a high rotation rate of the DC motor.
Figure 4:
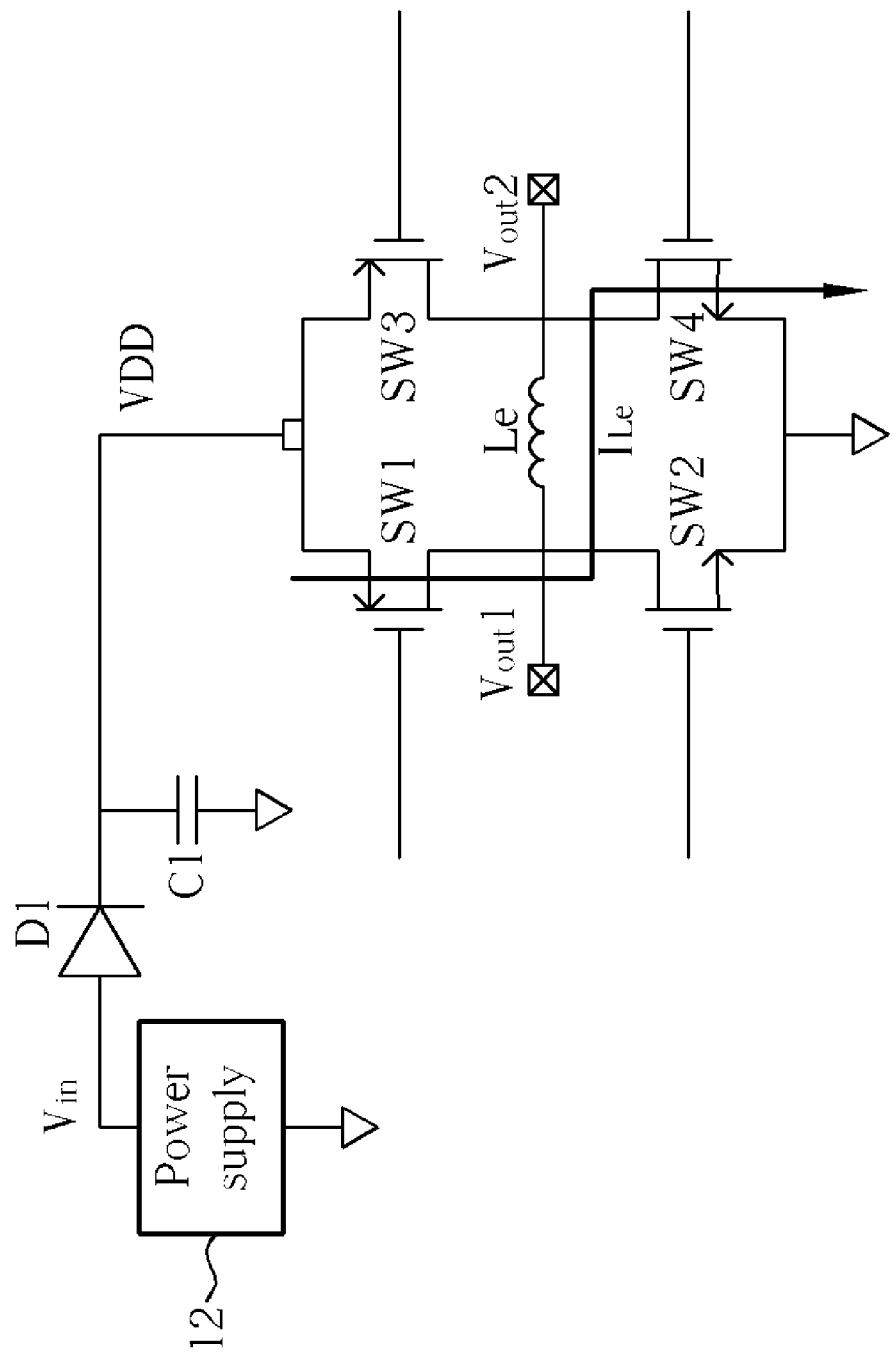
FIG. 4 is a diagram illustrating the flow of a motor current during the first stage shown in FIG. 3.
Figure 5:
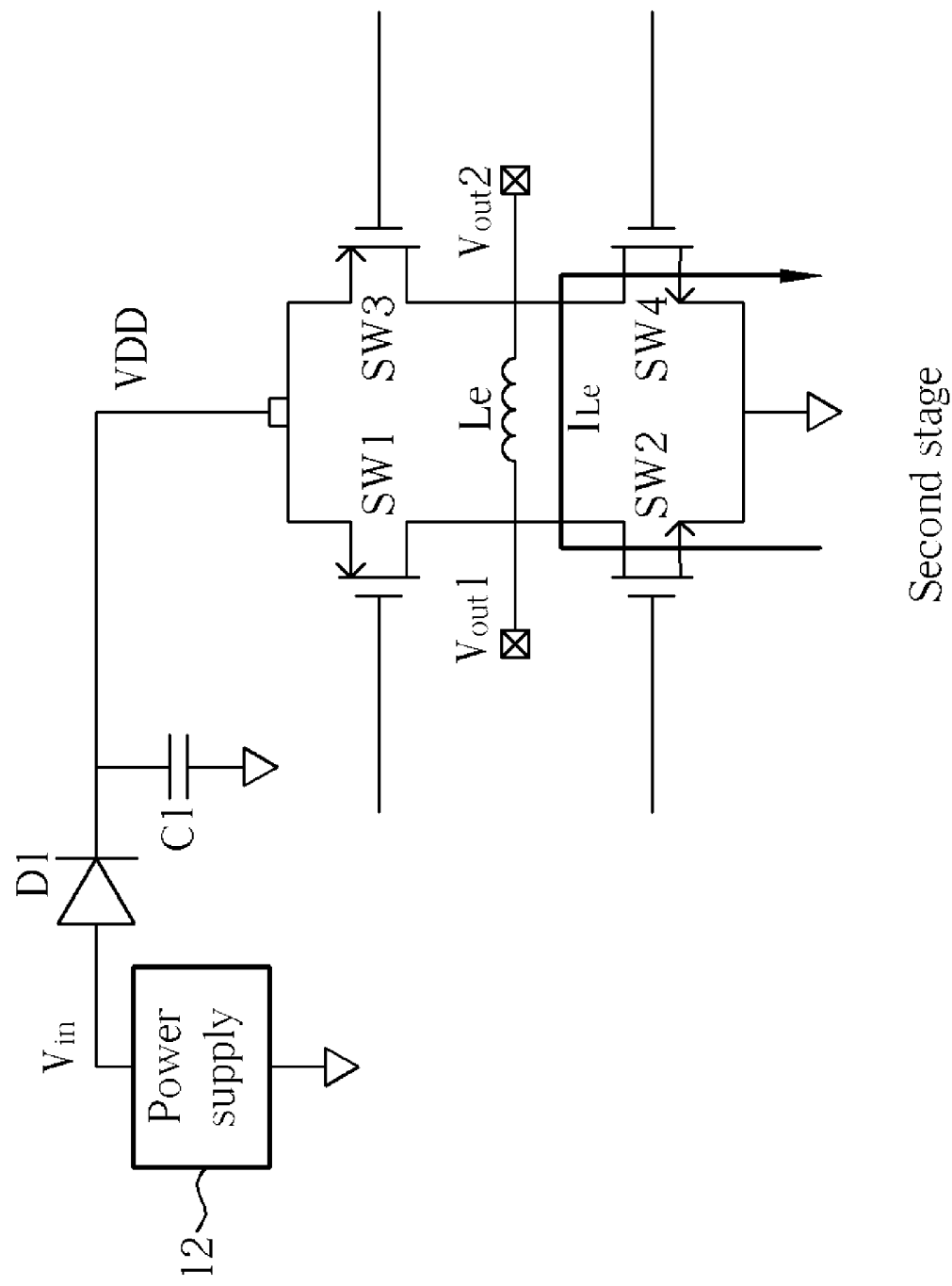
FIG. 5 is a diagram illustrating the flow of the motor current during the second stage shown in FIG. 3.
Figure 6:
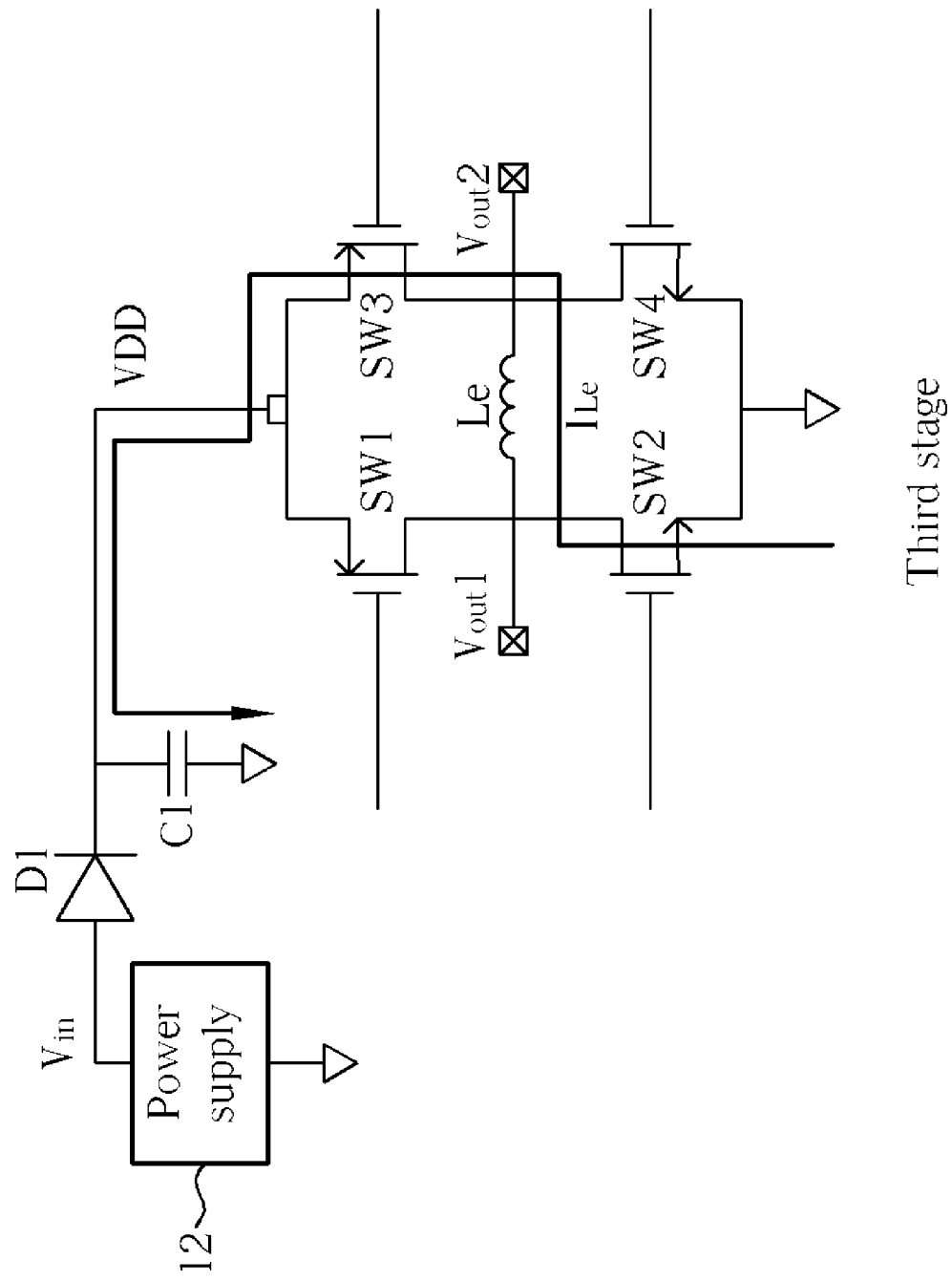
FIG. 6 is a diagram illustrating the flow of the motor current during the third stage shown in FIG. 3.
Figure 7:
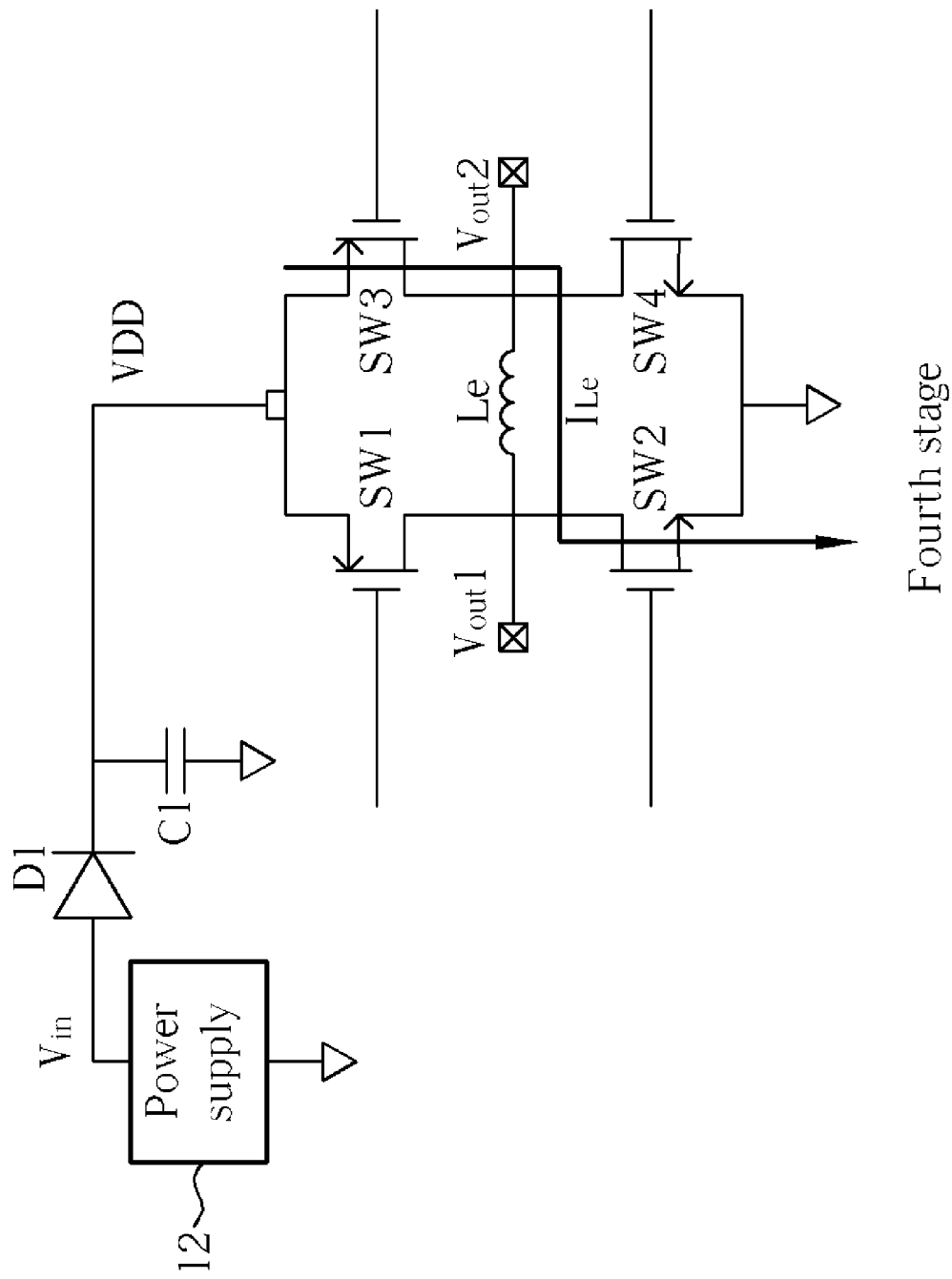
FIG. 7 is a diagram illustrating the flow of the motor current during the fourth stage shown in FIG. 3.
Figure 8:
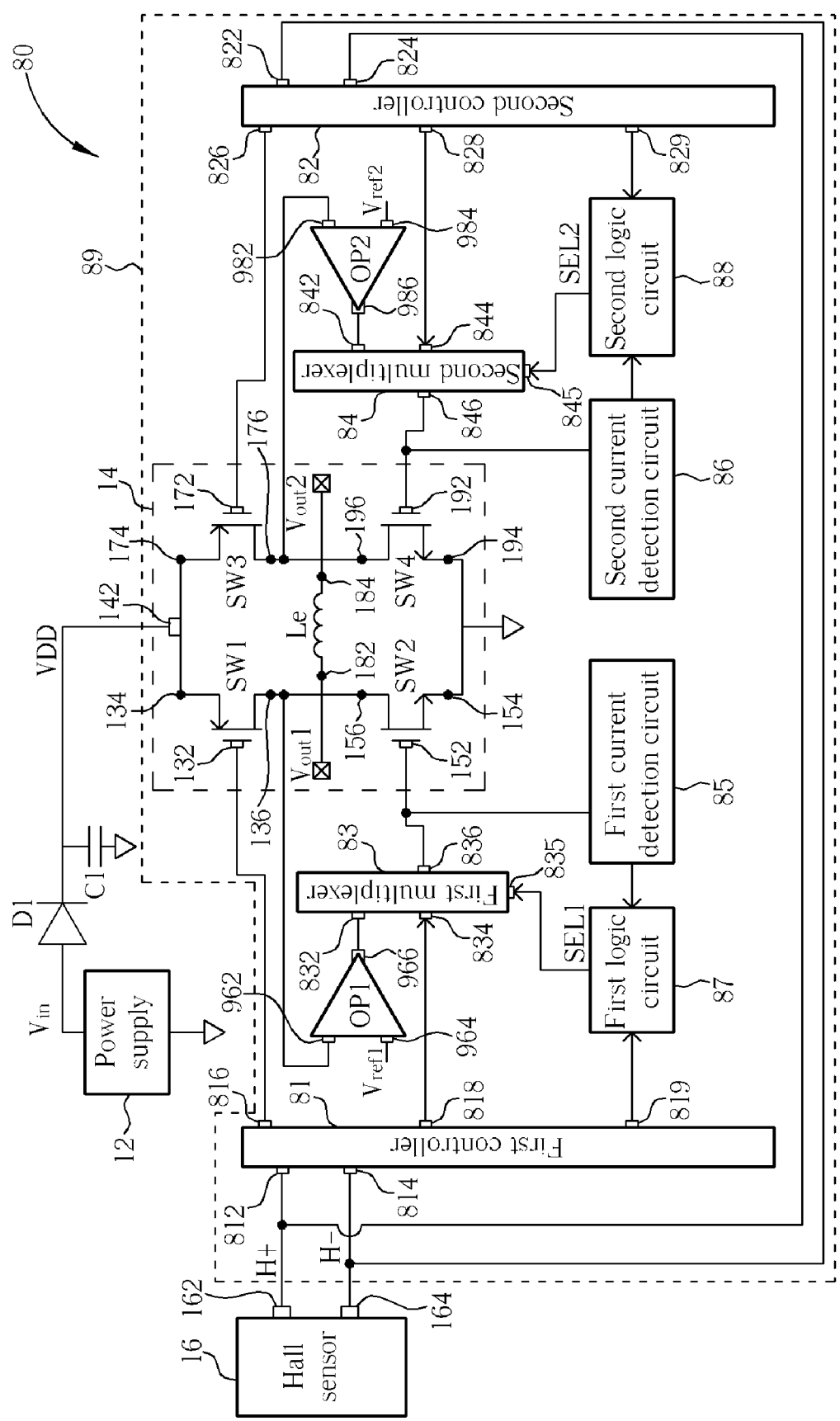
FIG. 8 is a diagram of a DC motor capable of avoiding reverse current according to an embodiment of the present invention.

Please refer to FIG. 8. FIG. 8 is a diagram of a DC motor 80 capable of avoiding reverse current according to an embodiment of the present invention. The DC motor 80 includes a power supply 12, an input capacitor C1, a protection diode D1, a Hall sensor 16, and a full bridge circuit 89. The power supply 12 is used for generating an input voltage Vin. The protection diode is coupled between the power supply 12 and the input capacitor C1 for protecting the power supply 12 and for avoiding IC burnout resulted from a wrong connection. The input capacitor C1 is coupled to the protection diode D1. A voltage difference between both terminals of the input capacitor C1 is a supply voltage VDD.

The Hall sensor 16 has a first output end 162 for generating a first timing control signal H+, and a second output end 164 for generating a second timing control signal H−.

The full bridge circuit 89 includes a full bridge driving circuit 14, a first controller 81, a second controller 82, a first operational amplifier OP1, a second operational amplifier OP2, a first multiplexer 83, a second multiplexer 84, a first logic circuit 87, a second logic circuit 88, a first current detection circuit 84, and a second detection circuit 86. The first controller 81 has a first input end 812 for receiving the first timing control signal H+, a second input end 814 for receiving the second timing control signal H−, a first output end 816 for generating a first switch control signal, a second output end 818 for generating a second switch control signal, and a third output end 819 for outputting a first logic control signal. The operational amplifier OP1 has a first input end 962 for receiving a first output voltage Vout1, a second input end 964 for receiving a first reference voltage Vref1.

The first logic circuit 87 is coupled between the third output end 819 of the first controller 81 and the control end 835 of the first multiplexer 83. The first logic circuit 87 is used for generating a first select signal SEL1 according to the first control signal outputted from the first controller 81.

The first multiplexer 83 has a first input end 832 coupled to an output end 966 of the first operational amplifier OP1, a second input end 834 coupled to the second output end 818 of the first controller 81, a control end 835 coupled to the first logic circuit 87, and an output end 836 used for controlling the first multiplexer 83 to input from the first input end 832 or the second input end 834 of the first multiplexer 83 according to the first select signal SEL1. The first current detection circuit 85 is used for detecting current of the DC motor 80.

The DC motor 80 and its control circuit further includes a first reference voltage generator coupled to the second input end 964 of the first operational amplifier OP1 for generating the first reference voltage Vref1. The second input end 964 of the first operational amplifier OP1 can be coupled to the supply voltage VDD. The second controller 82 has a first input end 822 used for receiving the second timing control signal H−, a second input end 824 used for receiving the first timing control signal H+, a first output end 826 used for generating a third switch control signal, a second output end 828 used for generating a fourth switch control signal, and a third output end 829 used for outputting a second logic control signal. The second operational amplifier OP2 has a first input end 982 for receiving the first output voltage Vout1, a second input end 984 for receiving a second reference voltage Vref2.

The second logic circuit 88 is coupled to the third output end 829 of the second controller 82 and the control end 845 of the second multiplexer 84. The second logic circuit 88 is used for generating a second select signal SEL2 according to the second control signal outputted from the second controller 82. The second multiplexer 84 has a first input end 842 coupled to an output end 986 of the second operational amplifier OP2, a second input end 844 coupled to the second output end 828 of the second controller 82, a control end 845 coupled to the second logic circuit 88, and an output end 846 used for controlling the second multiplexer 84 to input from the first input end 842 or the second input end 844 of the second multiplexer 84 according to the second select signal SEL2.

The second current detection circuit 86 is coupled between the output end 846 of the second multiplexer 84 and the second logic circuit 88. The second current detection circuit 86 is used for detecting currents of the DC motor 80. The DC motor 80 and its control circuit further include a second reference voltage generator coupled to the second input end 984 of the second operational amplifier OP2 for generating the second reference voltage Vref2. The second input end 984 of the second operational amplifier OP2 can be coupled to the supply voltage VDD.

Please keep referring to FIG. 8. The full bridge driving circuit 14 has an input end 142 coupled to the power supply 12 and to the input capacitor C1 that is the supply voltage VDD. The full bridge driving circuit 14 includes a first switch SW1, a second switch SW2, a third switch SW3, a fourth switch SW4, and a motor loading Le. The first switch SW1 has a control end 132 coupled to the first output end 816 of the first controller 81, an input end 134 coupled to the power supply 12 and to the input capacitor C1, and an output end 136 used for generating the first output voltage Vout1. The second switch SW2 has a control end 152 coupled to the output end 836 of the first multiplexer 83, an input end 154 coupled to ground, and an output end 156 coupled to the output end 136 of the first switch SW1. The third switch SW3 has a control end 172 coupled to the first output end 826 of the second controller 82, an input end 174 coupled to the power supply 12 and to the input capacitor C1, and an output end 176 used for generating the second output voltage Vout2. The fourth switch SW4 has a control end 192 coupled to the output end 846 of the second multiplexer 84, an input end 194 coupled to the ground, and an output end 196 coupled to the output end 176 of the third switch SW3.

The motor loading Le has a first end 182 coupled to the first switch SW1 and to the second switch SW2, and a second end 184 coupled to the third switch SW3 and the fourth switch SW4. The first switch SW1, the second switch SW2, the third switch SW3, and the fourth switch SW4 can be a metal-oxide semiconductor (MOS) each. For example, the first switch SW1 and the third switch SW3 can be a P-type metal-oxide semiconductor (PMOS), while the second switch SW2 and the fourth switch SW4 can be a N-type metal-oxide semiconductor (NMOS). The first switch SW1, the second switch SW2, the third switch SW3, and the fourth switch SW4 can also be a bipolar junction transistor (BJT) each. For example, the first switch SW1 and the third switch SW3 can be a NPN-type bipolar junction transistor, while the second switch SW2 and the fourth switch SW4 can be a PNP-type bipolar junction transistor. In the same way, the first switch SW1 and the third switch SW3 are PNP bipolar-junction transistors, and the second switch SW2 and the fourth switch SW4 are NPN bipolar-junction transistors. Even the four switches SW1-SW4 are all PNP bipolar-junction transistors or NPN bipolar-junction transistors.

Figure 9:
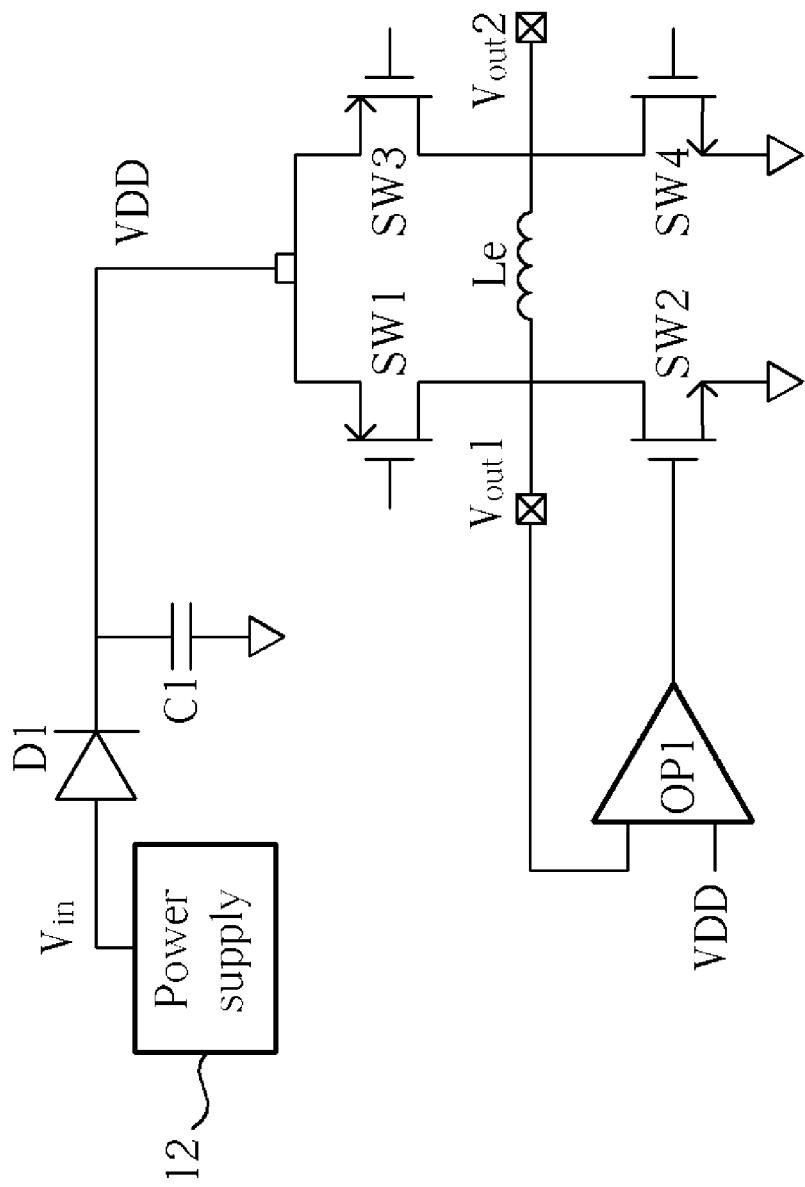
FIG. 9 is a diagram showing the conduction of the feedback loop in FIG. 8.

Please refer to FIG. 9. FIG. 9 is a diagram showing the conduction of the feedback loop in FIG. 8. The feedback loop comprised of the first operational amplifier OP1 and the second switch SW2 is selected by the first multiplexer 83. The first input end 962 of the first operational amplifier OP1 is used for receiving the first output voltage Vout1, and the second input end 964 is used for receiving the first reference voltage Vref1. Assume that the first reference voltage Vref1 is set as the supply voltage VDD. The first output voltage Vout1 is maintained at the same potential of the supply voltage VDD to increase a voltage difference between the first output voltage Vout1 and the second output voltage Vout2 and to decay a motor current $I_{Le}$ to zero by the feedback of the first operational amplifier OP1. Reverse current and voltage spike are avoided due to the first output voltage Vout1 being maintained at a potential equal to or lower than the supply voltage VDD. The first reference voltage Vref1 is not limited to the supply voltage VDD and can be another voltage.

Figure 10:
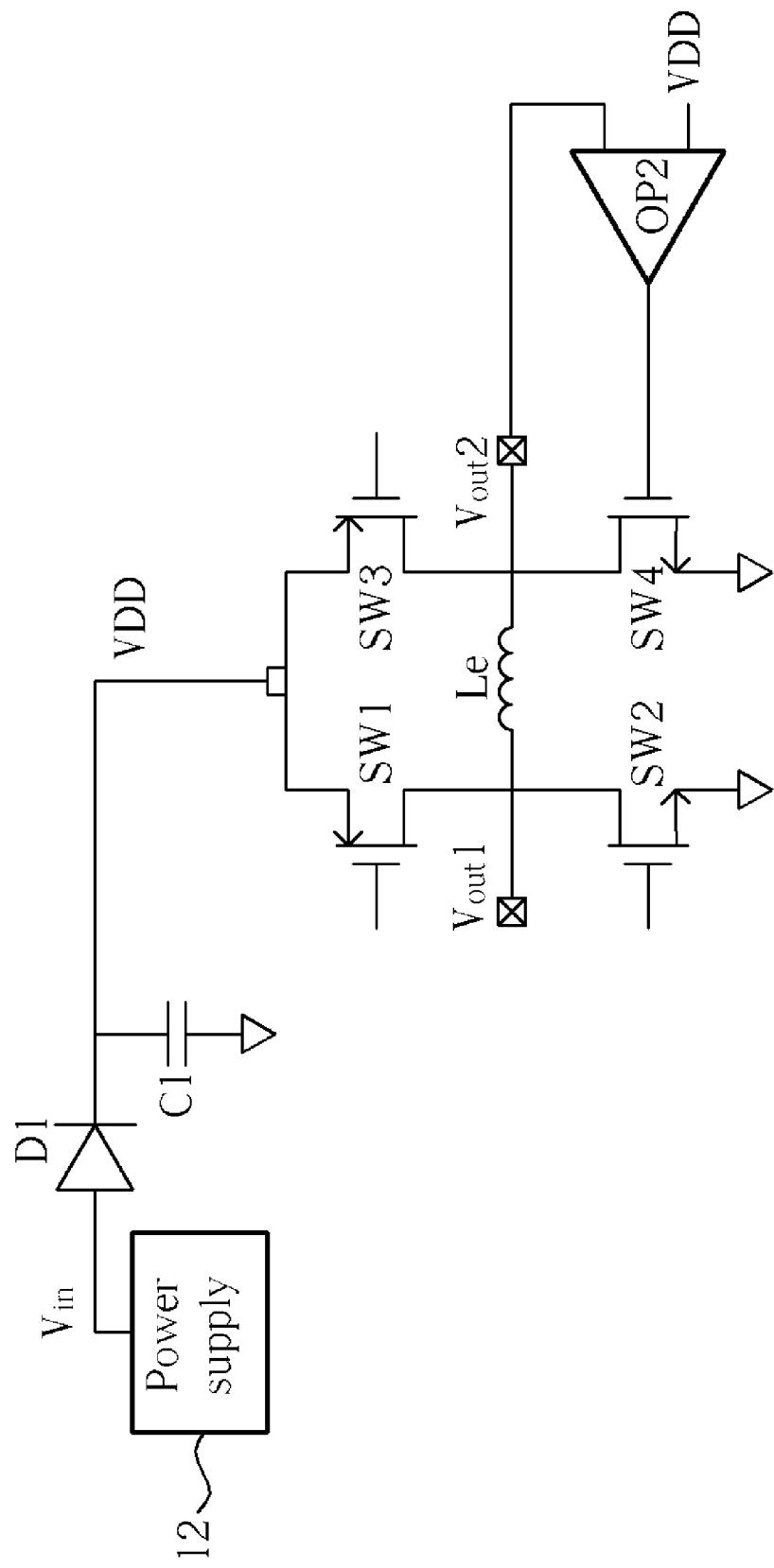
FIG. 10 is a diagram showing the conduction of another feedback loop in FIG. 8.

Please refer to FIG. 10 that is a diagram showing the conduction of another feedback loop in FIG. 8. The feedback loop comprised of the second operational amplifier OP2 and the fourth switch SW4 is selected by the second multiplexer 84. The first input end 982 of the second operational amplifier OP2 is used for receiving the second output voltage Vout2, and the second input end 984 is used for receiving the second reference voltage Vref2. Assume that the second reference voltage Vref2 is set as the supply voltage VDD. The second output voltage Vout2 is maintained at the same potential of the supply voltage VDD to increase a voltage difference between the second output voltage Vout2 and the first output voltage Vout1 and to decay a motor current $I_{Le}$ to zero by the feedback of the second operational amplifier OP2. Reverse current and voltage spike are avoided due to the second output voltage Vout2 being maintained at the potential equal to or lower than the supply voltage VDD. The second reference voltage Vref2 is not limited to the supply voltage VDD and can be another voltage.

Figure 11:
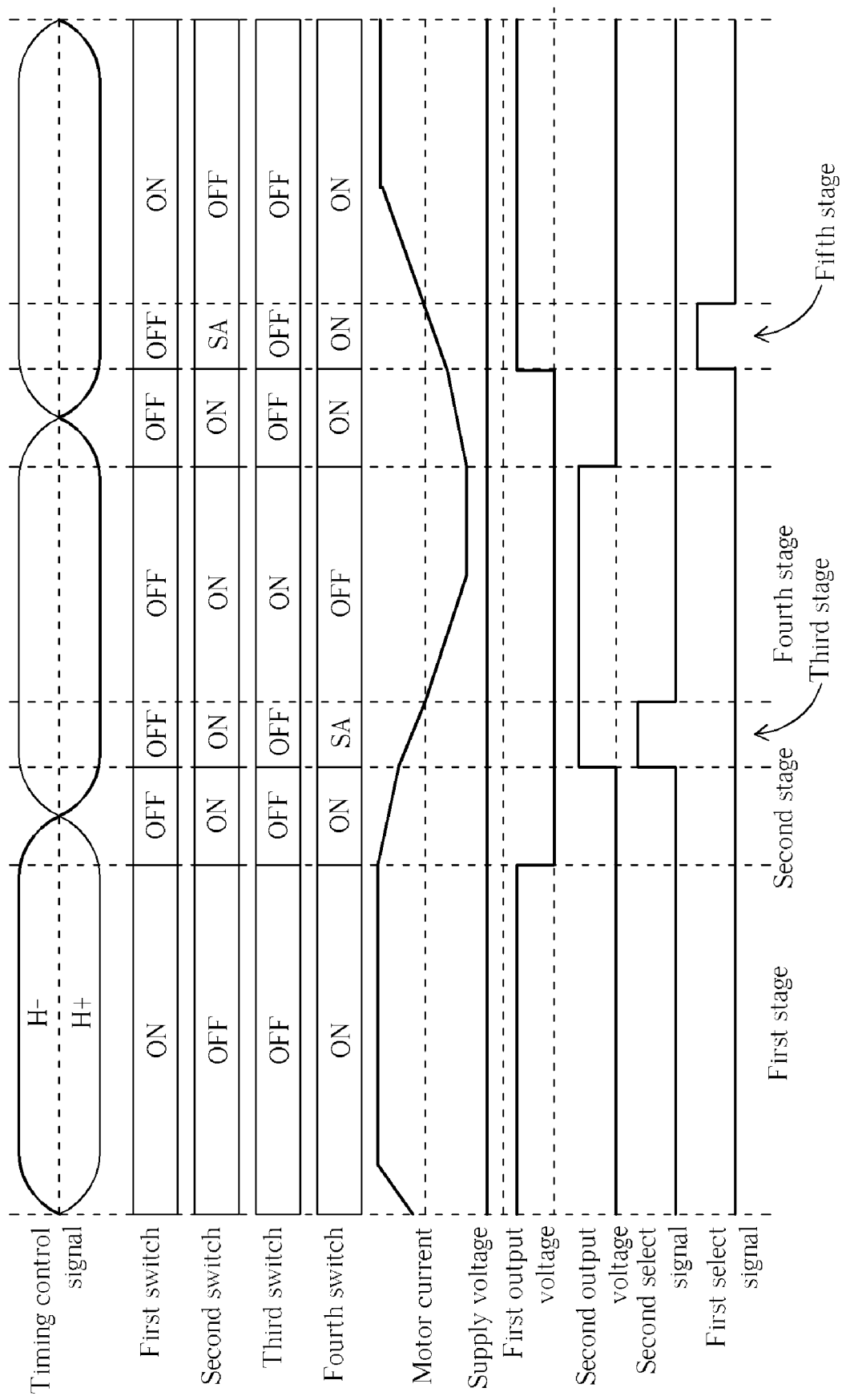
FIG. 11 is a diagram illustrating the signals of the DC motor of FIG. 8 with a high rotation rate of the DC motor.

Please refer to FIG. 11. FIG. 11 is a diagram illustrating the signals in FIG. 8 with a high rotation rate of the DC motor. During the first stage, the first timing control signal H+ is low and the second timing control signal H− is high. The motor current $I_{Le}$ flows from the first output voltage Vout1 to the second output voltage Vout2, at this time, the first output voltage Vout1 is high, and the second output voltage Vout2 is low. The signal outputted from the second output end 828 of the second controller 82 is selected to output to the fourth switch signal by the second multiplexer 84. At this time, the first switch SW1 and the fourth switch SW4 are fully on, and the second operational amplifier OP2 is in an open loop. During the second stage and the transition of the first timing control signal H+ and the second timing control signal H−, the motor current $I_{Le}$ weakens gradually through the second switch SW2 and the fourth switch SW4. Therefore, during the third stage, the signal outputted from the output end 986 of the second operational amplifier OP2 is selected to output to the fourth switch signal by the second multiplexer 84. The motor current $I_{Le}$ decays to zero quickly through the second switch SW2 and the fourth switch SW4 for avoiding voltage spikes due to the second output voltage Vout2 being maintained at the same potential of the supply voltage VDD. During the fourth stage, the signal outputted from the second output end 828 of the second controller 82 is selected to output to the fourth switch signal by the second multiplexer 84 again and the second operational amplifier OP2 recovers the open loop, when the second current detection circuit 86 detects the current of the fourth switch SW4 is zero.

Figure 12:
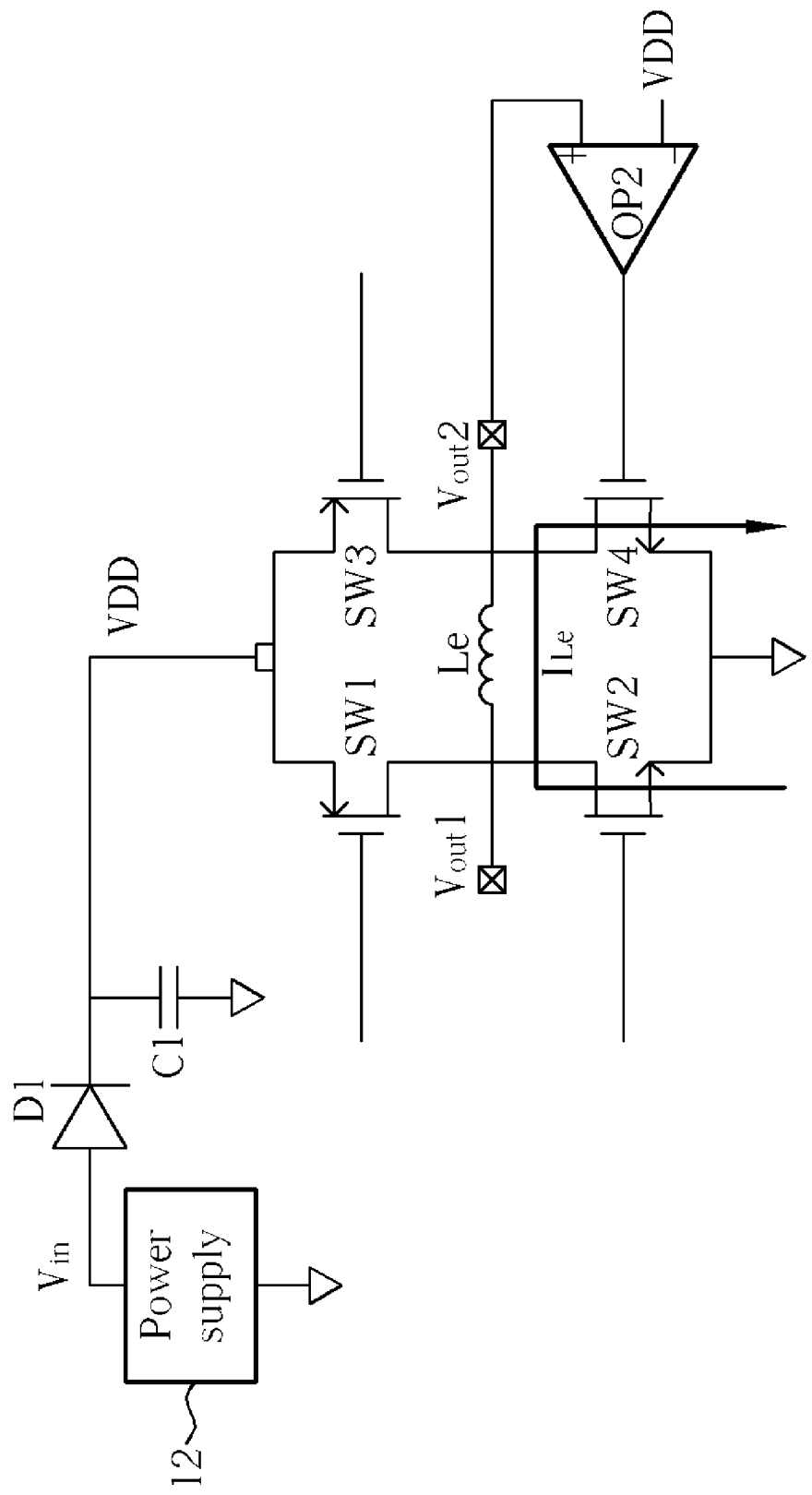
FIG. 12 is a diagram illustrating the flow of the motor current during the third stage shown in FIG. 11.

Please refer to FIG. 12. FIG. 12 is a diagram illustrating the flow of the motor current $I_{Le}$ during the third stage shown in FIG. 11. During the third stage, the signal outputted from the output end 986 of the second operational amplifier OP2 is selected to output to the fourth switch signal by the second multiplexer 84. A virtual short is formed at the two input ends 982 and 984 of the second operational amplifier OP2 and the second output voltage Vout2 is locked at the second reference voltage Vref2 (that is the supply voltage VDD) due to a negative feedback loop formed by loop gains of the second operational amplifier OP2. At this time, the motor current $I_{Le}$ is decayed to zero through the second switch SW2 and the fourth switch SW4.

Figure 13:
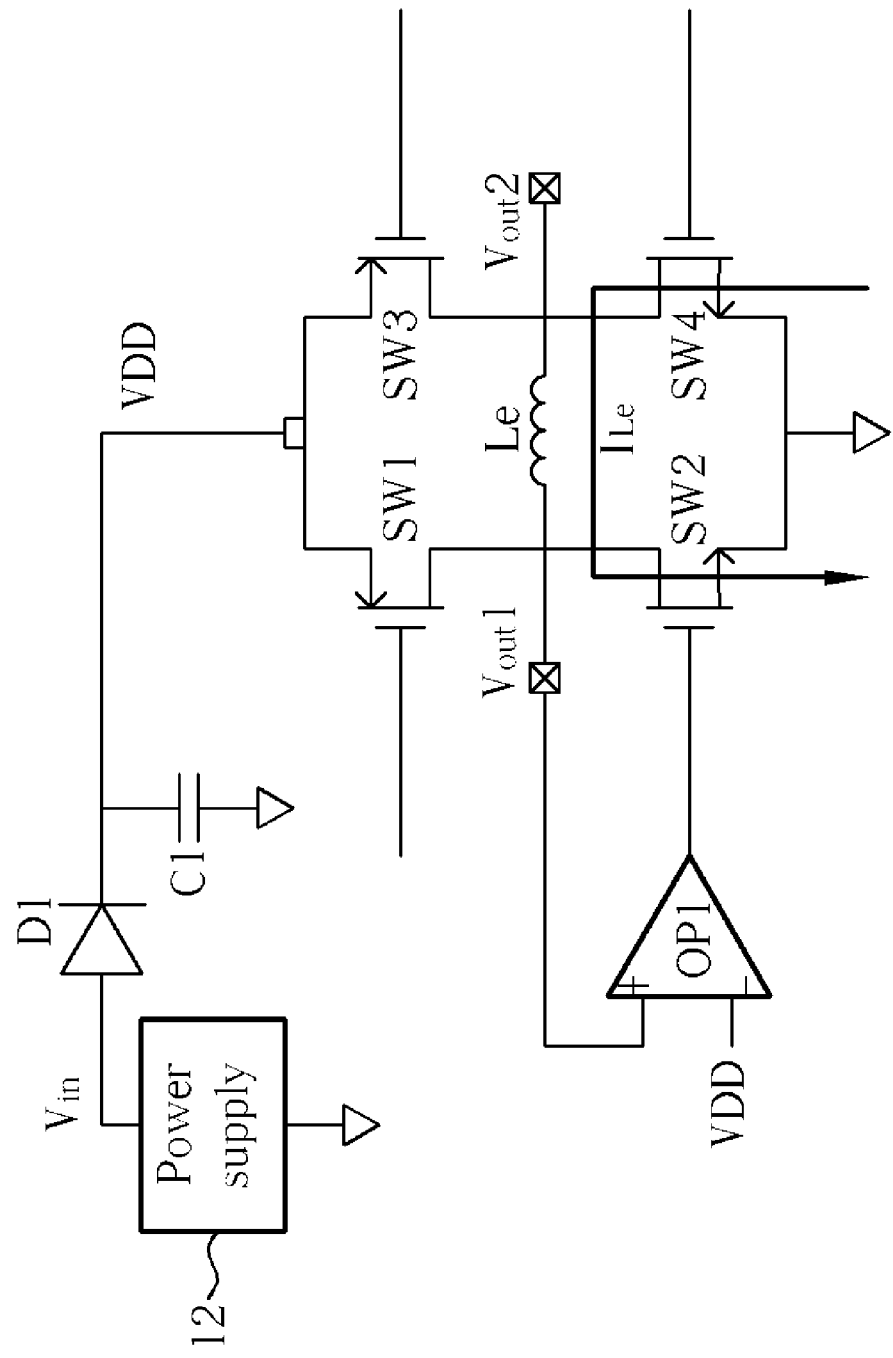
FIG. 13 is a diagram illustrating the flow of the motor current during the fifth stage shown in FIG. 11.

Please refer to FIG. 13 that is a diagram illustrating the flow of the motor current during the fifth stage shown in FIG. 11. During the fifth stage, the signal outputted from the output end 966 of the first operational amplifier OP1 is selected to output to the second switch signal by the first multiplexer 83. A virtual short is formed at the two input ends 962 and 964 of the first operational amplifier OP1 and the first output voltage Vout1 is locked at the first reference voltage Vref1 (that is the supply voltage VDD) due to a negative feedback loop formed by loop gains of the first operational amplifier OP1. At this time, the motor current $I_{Le}$ is decayed to zero through the second switch SW2 and the fourth switch SW4.

The abovementioned embodiments are presented merely for describing the present invention, and in no way should be considered to be limitations of the scope of the present invention. The potentials of the first reference voltage Vref1 and the second reference voltage Vref2 are both the supply voltage VDD in the abovementioned embodiments, though, are not limited to the supply voltage VDD in the present invention. The first switch SW1, the second switch SW2, the third switch SW3, and the fourth switch SW4 are not limited to be metal-oxide semiconductor transistors or bipolar-junction transistors, and other elements may also be utilized for implementing the abovementioned switches. Moreover, if only the first operational amplifier OP1, the first multiplexer 83, and the second switch SW2 are utilized whiling the second operational amplifier OP2, the second multiplexer 84, and the fourth switch SW4 do not exist, this situation can work and belongs to the present invention. Similarly, if only the second operational amplifier OP2, the second multiplexer 84, and the fourth switch SW4 are utilized whiling the first operational amplifier OP1, the first multiplexer 83, and the second switch SW2 don not exist, this situation also belongs to the present invention due to the framework of the DC motor 80 and the full bridge circuit 89 being symmetrical.

From the above descriptions, the present invention provides a DC motor 80 for avoiding reverse current. By virtual shorting the connection between the first input end 962 and the second input end 964 of the first operational amplifier OP1, the potential of the first output voltage Vout1 is fixed at the supply voltage VDD until the motor current $I_{Le}$ is dissipated for preventing the motor current $I_{Le}$ from reversely flowing to the supply voltage VDD thereby causing damage to the controllers and the drivers of the DC motor 80. By virtual shorting the connection between the first input end 982 and the second input end 984 of the second operational amplifier OP2, the potential of the second output voltage Vout2 is fixed at the supply voltage VDD until the motor current $I_{Le}$ is dissipated to zero. The present invention may also be applied in DC motors having a low rotation rate or a high rotation rate for effectively preventing a voltage spike and enhancing the reliability and the effective operational range of the system of the DC motor without the input capacitor C1. Furthermore, only one differential pair is needed to construct the first operational amplifier OP1 and the second operational amplifier OP2, and no internal compensation capacitors are needed in the negative feedback loop.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A full bridge circuit capable of fixing output voltage comprising:

a first switch;

a second switch, having an output end coupled to an output end of the first switch for generating a first output voltage;

a third switch having an input end coupled to an input end of the first switch;

a fourth switch having an input end coupled to an input end of the second switch and an output end coupled to an output end of the third switch for generating a second output voltage;

a first controller having a first output end coupled to a control end of the first switch and a second output end;

a second controller having a first output end coupled to a control end of the third switch and a second output end;

a first operational amplifier having a first input end coupled to the first switch and to the second switch for receiving the first output voltage, and a second input end for receiving a first reference voltage;
a first multiplexer having a first input end coupled to an output end of the first operational amplifier, a second input end coupled to the second output end of the first controller, a control end coupled to the first controller, and an output end coupled to a control end of the second switch, the first multiplexer used for connecting to the first input end or the second input end according to a first control signal received by the control end;
a second operational amplifier having a first input end coupled to the third switch and to the fourth switch for receiving the second output voltage, and a second input end for receiving a second reference voltage; and
a second multiplexer having a first input end coupled to an output end of the second operational amplifier, a second input end coupled to the second output end of the second controller, a control end coupled to the second controller, and an output end coupled to a control end of the fourth switch, the second multiplexer used for connecting to the first input end or the second input end according to a second control signal received by the control end.

2. The full bridge circuit of claim 1 further comprising:
a first logic circuit coupled between the first controller and the control end of the first multiplexer, the first logic circuit used for controlling the first multiplexer to input from the first input end or the second input end of the first multiplexer according to the first control signal outputted from the first controller; and
a first current detection circuit coupled between the output end of the first multiplexer and the first logic circuit, the first current detection circuit used for detecting current.

3. The full bridge circuit of claim 1 further comprising a first reference voltage generator coupled to the second input end of the first operational amplifier for generating the first reference voltage.

4. The full bridge circuit of claim 1 further comprising:
a second logic circuit coupled between the second controller and the control end of the second multiplexer, the second logic circuit used for controlling the first multiplexer to input from the first input end or the second input end of the second multiplexer according to the second control signal outputted from the second controller; and
a second current detection circuit coupled between the output end of the second multiplexer and the second logic circuit, the second current detection circuit used for detecting current.

5. The full bridge circuit of claim 1 further comprising a second reference voltage generator coupled to the second input end of the second operational amplifier for generating the second reference voltage.

6. The full bridge circuit of claim 1 wherein the first switch, the second switch, the third switch, and the fourth switch are a metal-oxide semiconductor (MOS) or a bipolar junction transistor (BJT) each.

7. The full bridge circuit of claim 1 wherein the first switch and the third switch are a P-type metal-oxide semiconductor (PMOS) or a NPN-type bipolar junction transistor, and the second switch and the fourth switch are a N-type metal-oxide semiconductor (NMOS) or a PNP-type bipolar junction transistor.

8. A DC motor capable of avoiding reverse current comprising:
a Hall sensor having a first output end for generating a first timing control signal, and a second output end for generating a second timing control signal; and
a full bridge circuit comprising:
a first switch;
a second switch, having an output end coupled to an output end of the first switch for generating a first output voltage;
a third switch having an input end coupled to an input end of the first switch;
a fourth switch having an input end coupled to an input end of the second switch and an output end coupled to an output end of the third switch for generating a second output voltage;
a first controller having a first input end coupled to the first output end of the Hall sensor, a second input end coupled to the second output end of the Hall sensor, a first output end coupled to a control end of the first switch, and a second output end;
a second controller having a first input end coupled to the second output end of the Hall sensor, a second input end coupled to the first output end of the Hall sensor, a first output end coupled to a control end of the third switch, and a second output end coupled to a control end of the fourth switch;
a first operational amplifier having a first input end coupled to the first switch and to the second switch for receiving the first output voltage, and a second input end for receiving a first reference voltage;
a first multiplexer having a first input end coupled to an output end of the first operational amplifier, a second input end coupled to the second output end of the first controller, a control end coupled to the first controller, and an output end coupled to a control end of the second switch, the first multiplexer used for connecting to the first input end or the second input end according to a first control signal received by the control end;
a second operational amplifier having a first input end coupled to the third switch and to the fourth switch for receiving the second output voltage, and a second input end for receiving a second reference voltage; and
a second multiplexer having a first input end coupled to an output end of the second operational amplifier, a second input end coupled to the second output end of the second controller, a control end coupled to the second controller, and an output end coupled to a control end of the fourth switch, the second multiplexer used for connecting to the first input end or the second input end according to a second control signal received by the control end.

9. The DC motor of claim 8 wherein the full bridge circuit further comprises:
a first logic circuit coupled between the first controller and the control end of the first multiplexer, the first logic circuit used for controlling the first multiplexer to input from the first input end or the second input end of the first multiplexer according to the first control signal outputted from the first controller; and
a first current detection circuit coupled between the output end of the first multiplexer and the first logic circuit, the first current detection circuit used for detecting current of the DC motor.

10. The DC motor of claim 8 wherein the full bridge circuit further comprises: a first reference voltage generator coupled to the second input end of the first operational amplifier for generating the first reference voltage.

11. The DC motor of claim 8 wherein the full bridge circuit further comprises
   a second logic circuit coupled between the second controller and the control end of the second multiplexer, the second logic circuit used for controlling the first multiplexer to input from the first input end or the second input end of the second multiplexer according to the second control signal outputted from the second controller; and
   a second current detection circuit coupled between the output end of the second multiplexer and the second logic circuit, the second current detection circuit used for detecting current of the DC motor.

12. The DC motor of claim 8 wherein the full bridge circuit further comprises a second reference voltage generator coupled to the second input end of the second operational amplifier for generating the second reference voltage.

13. The DC motor of claim 8 further comprising:
   a power supply for generating an input voltage; and
   a protection device coupled between the power supply and the full bridge circuit for protecting the power supply.

14. The DC motor of claim 13 wherein the protection device is a diode.

15. The DC motor of claim 8 wherein the first switch, the second switch, the third switch, and the fourth switch are a metal-oxide semiconductor (MOS) or a bipolar junction transistor (BJT) each.

16. The DC motor of claim 8 wherein the first switch and the third switch are a P-type metal-oxide semiconductor (PMOS) or a NPN-type bipolar junction transistor, and the second switch and the fourth switch are a N-type metal-oxide semiconductor (NMOS) or a PNP-type bipolar junction transistor.

* * * * *